United States Patent [19]
Joffe

[11] Patent Number: 5,440,523
[45] Date of Patent: Aug. 8, 1995

[54] MULTIPLE-PORT SHARED MEMORY INTERFACE AND ASSOCIATED METHOD

[75] Inventor: Alexander Joffe, Palo Alto, Calif.

[73] Assignee: Multimedia Communications, Inc., Santa Clara, Calif.

[21] Appl. No.: 109,805

[22] Filed: Aug. 19, 1993

[51] Int. Cl.[6] .................... G11C 11/401; G11C 8/04
[52] U.S. Cl. .................... 365/230.05; 365/230.08; 365/231; 365/230.01; 365/189.04
[58] Field of Search .................... 365/230.05, 230.01, 365/230.08, 231, 189.04

[56] References Cited

U.S. PATENT DOCUMENTS

| | | | |
|---|---|---|---|
| 4,888,741 | 12/1989 | Malinowski | 365/230.05 |
| 4,891,794 | 1/1990 | Hush et al. | 365/230.05 |
| 5,142,638 | 8/1992 | Schiffleger | |
| 5,204,841 | 4/1993 | Chappell et al. | 365/230.05 |
| 5,278,967 | 1/1994 | Curran | 395/425 |
| 5,337,287 | 8/1994 | Nishikawa | 365/230.05 |

FOREIGN PATENT DOCUMENTS

0187518  7/1986  European Pat. Off. .
5-151769  6/1993  Japan .

OTHER PUBLICATIONS

Translation of document No. 5-51769 (Japan) naming Kubo. This reference was cited by the Examiner in the office Action dated Nov. 7, 1994.
International Search Report PCT/US94/09364 which cites the first two references above.

*Primary Examiner*—Viet Q. Nguyen
*Attorney, Agent, or Firm*—Wilson, Sonsini, Goodrich & Rosati

[57] ABSTRACT

A multi-port shared memory system is provided which includes multiple ports for transferring data; a plurality of memory access buffers; and an interconnection matrix circuit for distributing subsets of data between the ports and the buffers.

30 Claims, 10 Drawing Sheets

MULTIPLE-PORT SHARED MEMORY INTERFACE AND ASSOCIATED METHOD

BACKGROUND OF THE INVENTION

1. Field of Invention

The invention relates generally to memory interface systems, and more specifically to a method and apparatus for providing and arbitrating access to a shared memory by multiple devices, for applications such as multiprocessor systems and communications switching.

2. Description of the Related Art

Shared memories are used to facilitate data passing between multiple processes. A typical shared memory implementation involves the use of multiple ports. Each port may provide shared memory access to a different external device. The different devices, in turn, may be involved with the control or execution of different processes that pass the data.

In order to provide each port with access to the shared memory which is not significantly impacted by shared memory accesses by other ports, the path to the shared memory typically is designed with a bandwidth close to the sum of the bandwidths of the individual ports. This ensures that the data carrying capacity of the path is sufficiently large so that no port suffers a significant delay in accessing the shared memory even though multiple ports may seek access to the shared memory. Generally, this is achieved in one of two ways, or some combination thereof. First, the shared memory access time may be designed to be much faster than the data transfer times for the individual ports. Second, the path width to the shared memory may be designed to be much greater than the path widths of the individual ports.

The first approach is to assign a time slot to each port during which data can be read from or written to the shared memory. For each port, the assigned time slot is shorter than the actual time required to transfer data through the port. Thus, the data is buffered temporarily during its transfer between a port and the shared memory. Ordinarily, the length of the port time slot is inversely proportional to the number of devices sharing access to the shared memory. A device using a particular port can gain access to the memory only during the assigned time slot for that port. Data is buffered between time slots. There have been shortcomings with this approach. For example, it often requires the memory access time to be significantly less than the port data transfer time. However, it is often impractical to have such a mismatch between data transfer rates for the ports and the shared memory.

The second approach also involves assigning a time slot to each port. For example, writes to the shared memory involve temporarily buffering multiple data words received at a respective port, and then providing them to the memory on a wide memory path all in one memory access cycle during the time slot designated for the port. Conversely, reads from the shared memory involve providing multiple words on the wide path all in one memory access cycle during a time slot designated for a respective port; temporarily buffering the words read from memory; and then transferring the words through the port. This second approach is particularly well suited to burst-mode systems in which data words are communicated in multi-word bursts through respective ports. A complete burst may be temporarily stored in a memory access buffer, and then may be written or read during a single memory access cycle through such a wide bandwidth path to the shared memory. By providing a path with an appropriately large bandwidth, each port may be made to appear to have exclusive access to the shared memory, unimpeded by data transfers through other ports.

The illustrative block diagram of FIG. 1 depicts an earlier implementation of a multi-port memory system in which k ports, each having word width m, equally share a common memory. Each burst includes k words. K memory access buffers each can store k m-bit words. Each buffer is connected to the shared memory by a k x m line wide path. The shared memory is k x m bits wide.

The illustrative drawings of FIG. 2 show a data format used in a typical multiport memory system such as that in FIG. 1. During a transfer of data into the shared memory, a k word burst of m-bit words passes through a port. The entire burst is briefly stored in a single memory access buffer. Then, during a prescribed time slot, all k-words of the burst are simultaneously transferred from the buffer and written to the shared memory on the k x m path. During a transfer of data out of the shared memory, k words are read from the shared memory during another prescribed time slot and are transferred to a single memory access buffer. Then the buffered data is transferred through the port associated with that buffer.

The port which originally inputted the burst may be different from the port that outputs the burst. The shared memory temporarily stores the burst so that it can be routed from the input port to the output port. Thus, the system of FIG. 1 can be used to pass data between ports.

More specifically, for example, in a memory write operation, k m-bit words received through a respective port are buffered by a memory access buffer assigned to that port. Subsequently, during a time slot reserved for that memory access buffer, all of the k m-bit words stored in the assigned buffer are simultaneously written to the shared memory on the shared k x m-bit wide path. In a like manner, each of the other buffers can store k m-bit words on behalf of their own associated ports. The entire contents (all k words) of each individual buffer can be written to the shared memory during the individual time slot reserved for that buffer. A memory read operation is analogous, with the steps of the write operation reversed.

A disadvantage of this prior implementation is the large number of interconnection pins between a buffer and the bus in a large multi-port system. FIG. 3 is a block diagram depicting another conventional multi-port shared memory system. The data format used involves 16 word bursts of 72 bits per word (64-bit data plus 8-bit parity). The shared memory bus has a width of 1152 lines (16 words × 72 bits/word). The bus is connected to each of 16 memory access buffers. Each buffer would need more than 1224 data pins, 1152 to connect to the bus and 72 to connect to the port. Unfortunately, the 1152 data pins connected to the bus would each require high drive capability to operate on a bus connected to all 16 buffers and to the shared memory. FIG. 3 shows an illustrative bus capacitance that must be overcome by the buffer pins.

Thus, there has been a need for an improved architecture for providing multiple port access to a shared memory. The architecture should require fewer pins for memory access buffers and should not require high drive capability for buffer pins. The present invention meets those needs.

SUMMARY OF THE INVENTION

A novel multi-port memory system is provided. The memory system includes a random access memory. Multiple buffers are provided for temporarily storing data during transfer of the data between respective ports and the random access memory. A data path interconnects the random access memory and the multiple buffers. An interconnect circuit conducts different prescribed subsets of data between the ports and different prescribed buffers.

In another aspect, a method is provided for the transfer of port bursts between a random access memory and multiple data ports. A port burst is a multi-word burst of data transferred through a single port. Data words in respective port bursts are partitioned into multiple subsets. Each data word subset is associated with a temporary storage buffer. Data word subsets are conducted between respective ports and their respective associated buffers where they are temporarily stored. An entire port burst can be transferred between the multiple buffers and the random access memory in a single memory access cycle.

The present invention reduces the number of pin connections required to transfer a multi-word burst of data between a port and a shared memory. Further, a present embodiment of the invention reduces the output drive requirements of memory access buffers.

These and other purposes and advantages of the present invention will become more apparent to those skilled in the art from the following detailed description in conjunction with the appended drawings in which:

DETAILED DESCRIPTION OF THE PREFERRED EMBODIMENTS

The present invention comprises a novel method and apparatus for implementing a multi-port shared memory system. The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
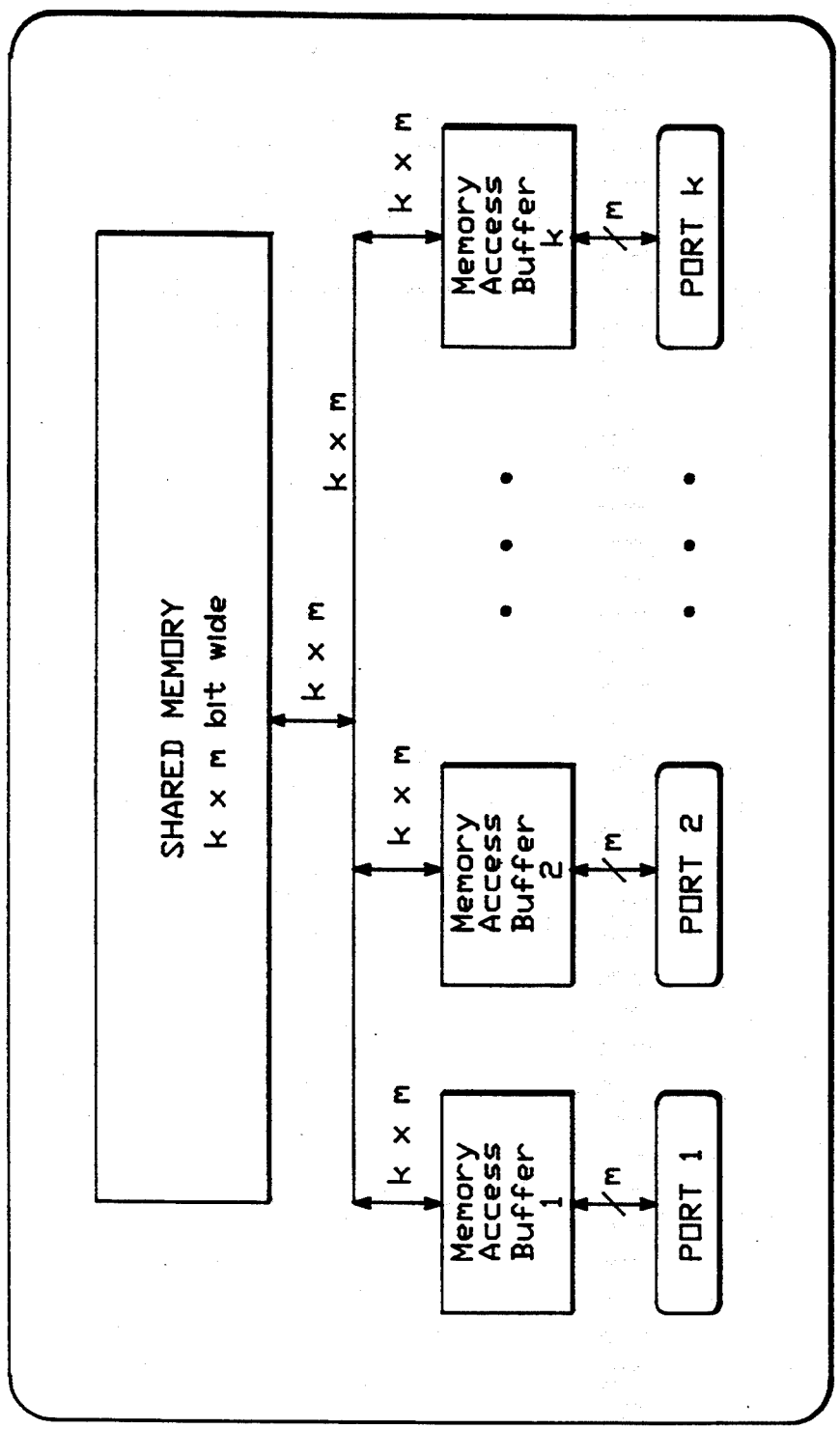
FIG. 1 is a block diagram of an earlier multi-port shared memory system.
Figure 2:
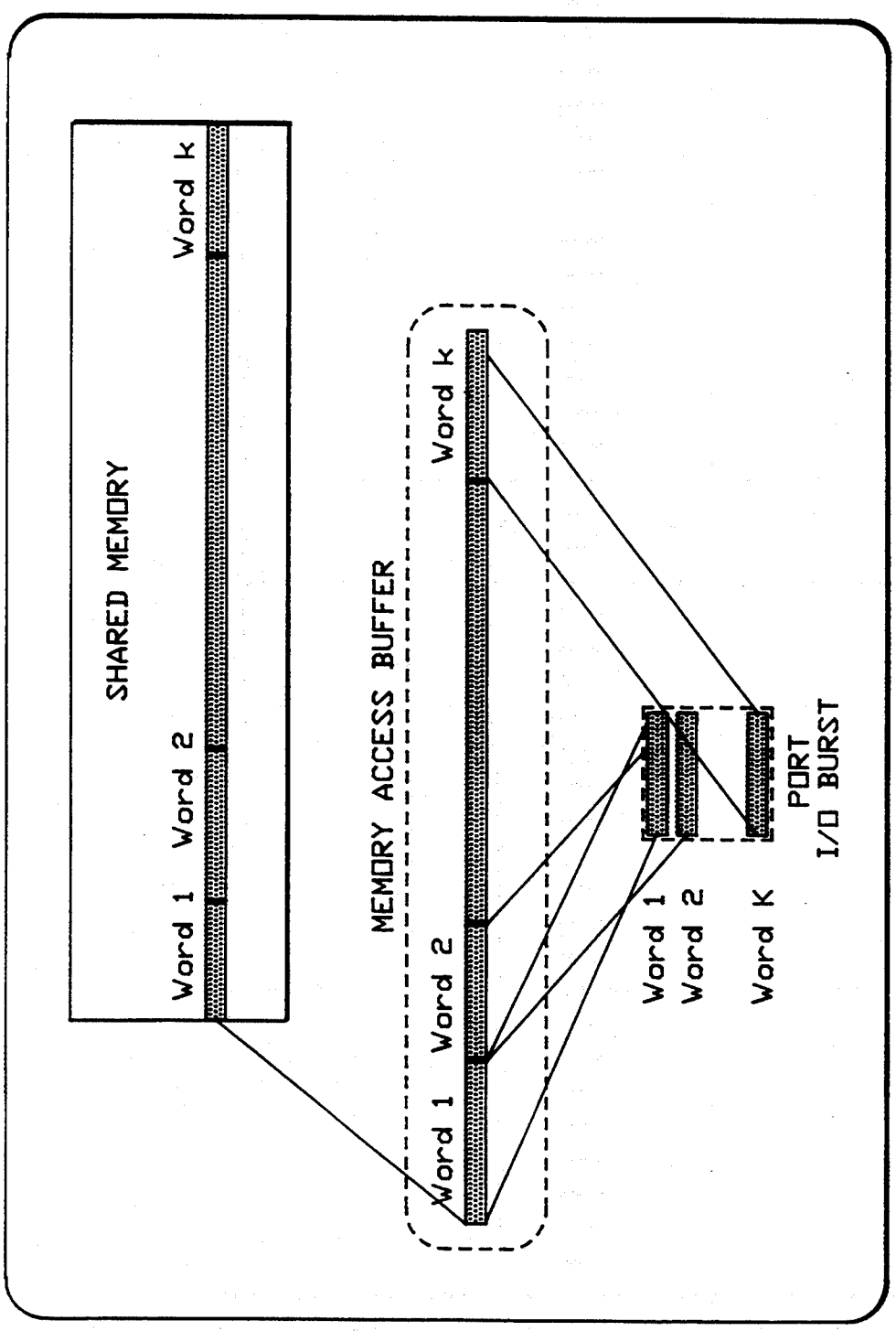
FIG. 2 is a data format which can be used in the earlier system of FIG. 1.
Figure 3:
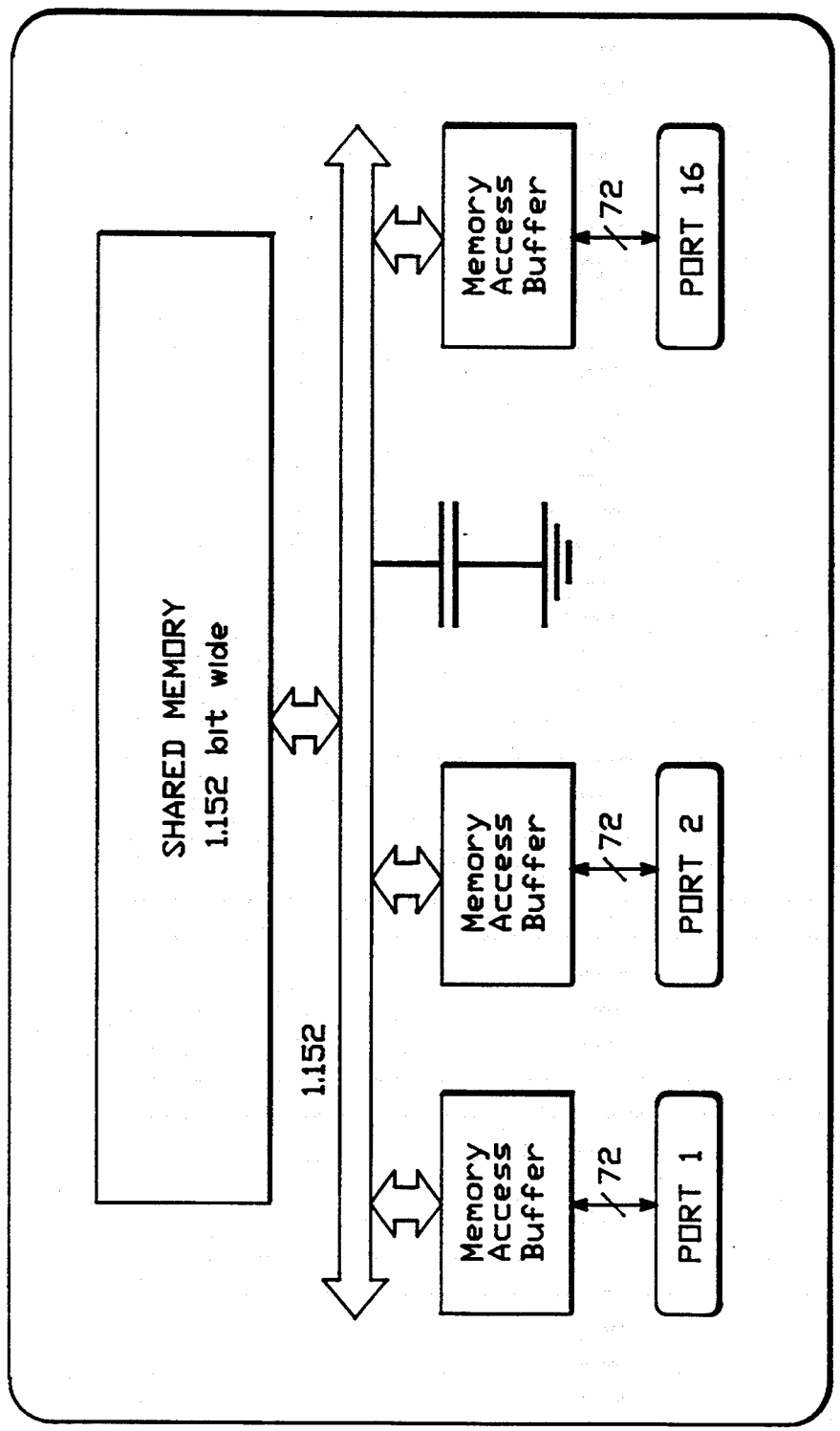
FIG. 3 is a block diagram of another earlier multi-port shared memory system.
Figure 4:
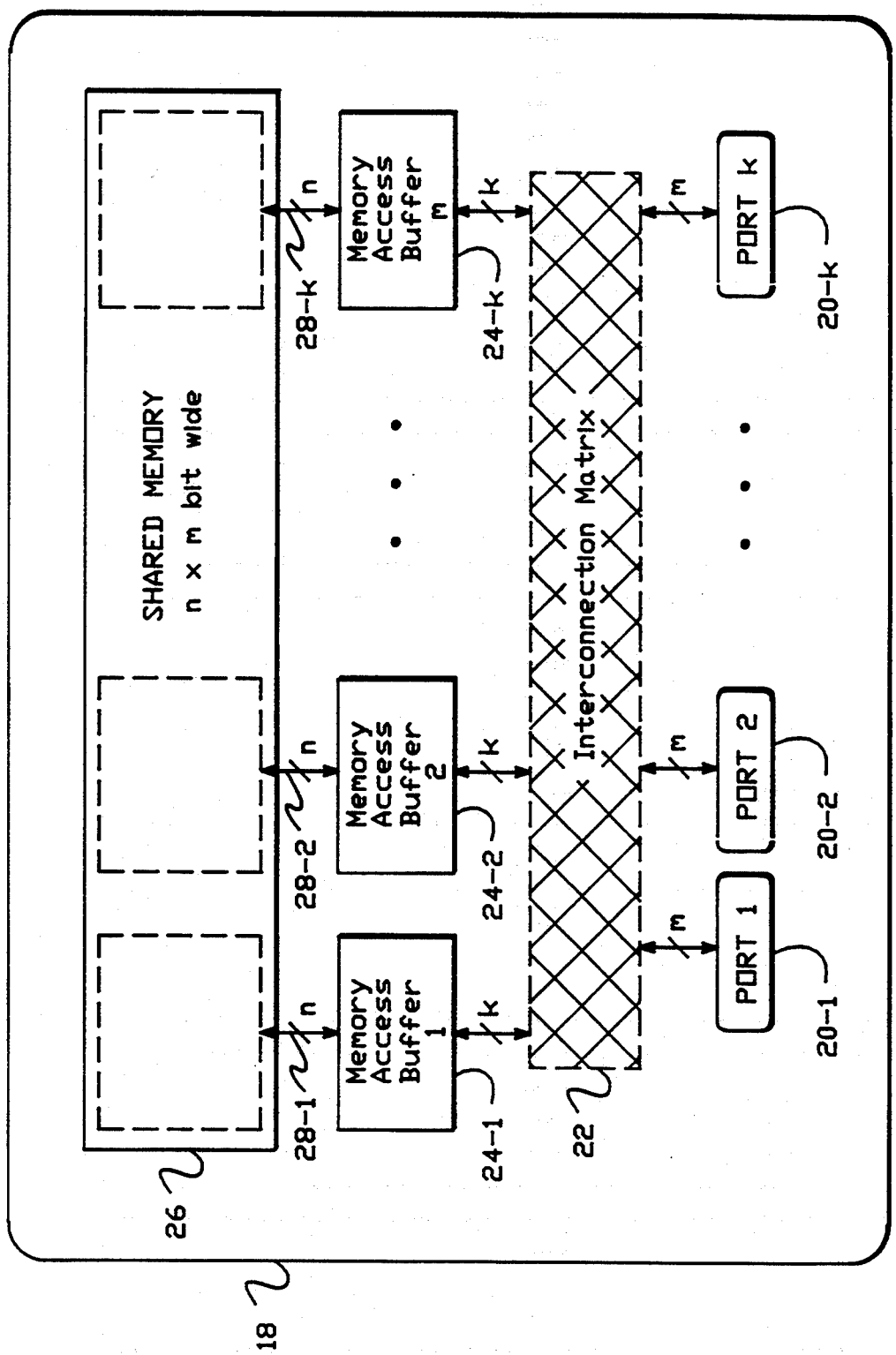
FIG. 4 is a generalized block diagram of a first multi-port shared memory system in accordance with the present invention.

Referring now to FIG. 4, there is shown a block diagram of a first multi-port shared memory system 18 in accordance with the present invention. The first system 18 includes a set of k ports 20 each inputting-/outputting m-bit data words in n-word bursts, an interconnection matrix circuit 22, a set of m memory access buffers 24, and a shared memory 26. A port serves as a two-way digital path on which digital information can be transferred to or from external circuitry such as a data bus. Port structures are well known to those skilled in the art and need not be described herein. Specific regions within the shared memory 26, indicated by dashed lines, are reserved for subsets of the data temporarily stored in the buffers 24.

During memory write operations, the ports 20 transfer binary data from individual external devices (not shown) connected thereto. These ports 20 provide the received binary data to the interconnection matrix 22, which distributes the data transferred through the ports among the memory access buffers 24. In the present embodiment, the distribution is accomplished such that each memory access buffer 24 receives a subset of the data transferred by each of the ports. In the present embodiment, each buffer 24 can transfer in parallel to memory 26 all of the data received by the buffer from an individual port. Moreover, all of the parallel transfers of data received from such an individual port can occur during a single memory access cycle.

The memory read operation is analogous with the steps of the write operation, but reversed. That is, the bits for n m-bit words are transferred from the shared memory and are distributed among the memory access buffers 24. The interconnection matrix 22 then provides the distributed bits to a single port 20 through which a burst comprising n m-bit words is transferred to an external device (not shown).

Figure 5:
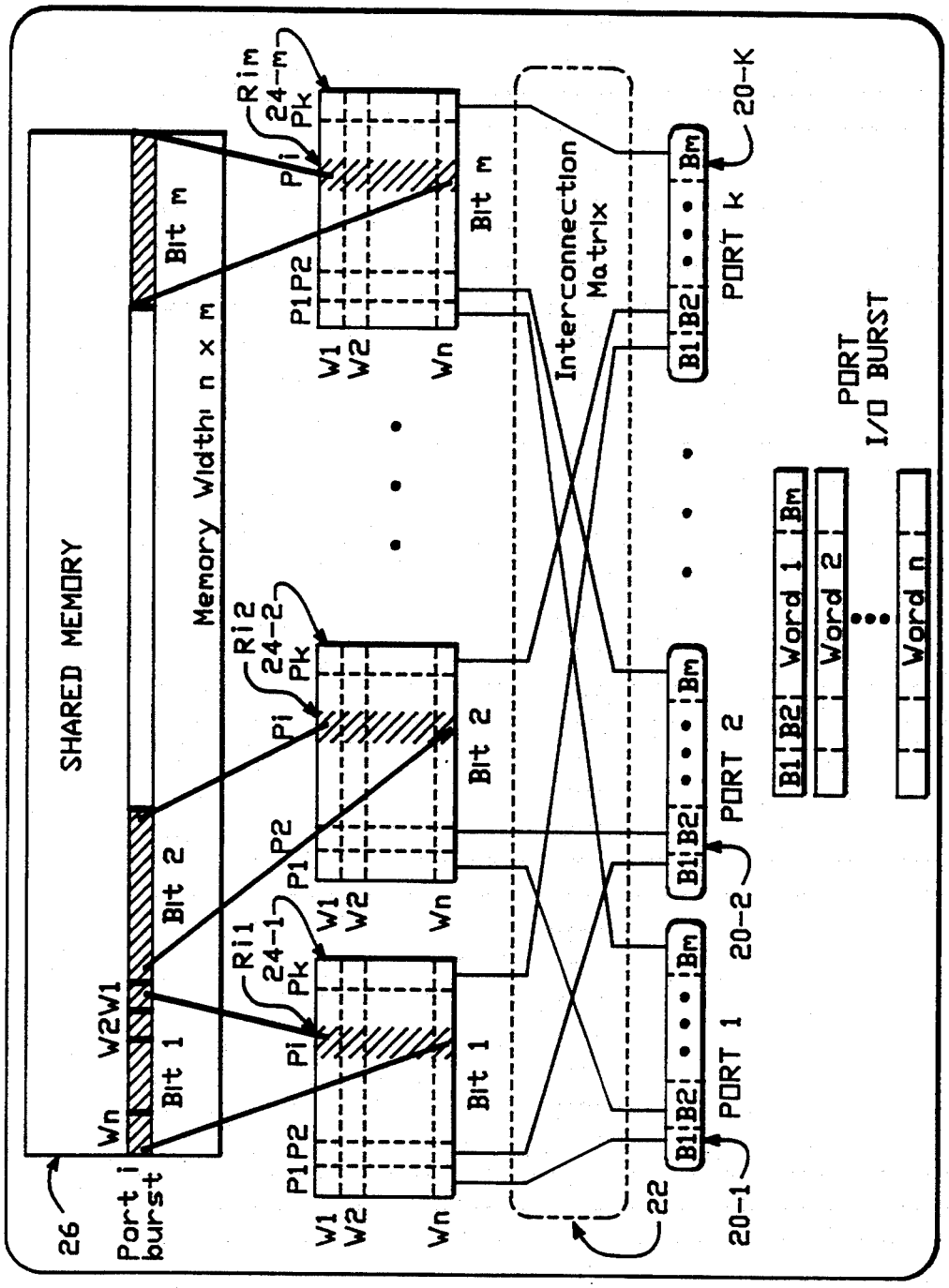
FIG. 5 shows a data format and data flow used in the embodiment of FIG. 4.

Referring now to FIG. 5, a diagram is shown which illustrates details of the interconnection matrix circuit 22, the data format and data flow presently used in the first system 18. Each memory access buffer 24 is dedicated to storing a specific bit position for every data word transferred through any of the ports. Data words may contain data and parity information. In a presently preferred embodiment, the total number of memory access buffers 24 is equal to the total number of bits per word (m), thus allowing each buffer to be responsible for a single bit position in every word. For example, memory access buffer 24-1 stores bit 1 (B1) of each word transferred through any of the ports 20-1 to 20-k; memory access buffer 24-2 stores bit 2 (B2) of each word transferred through any of ports 20-1 to 20-k; etc.

Referring again to FIG. 4, each memory access buffer 24-1 through 24-m is connected to the shared memory 26 by a set of n data lines 28-1 through 28-k. Thus, the m-subsets, each subset with n bits of different order bits can be simultaneously transferred between the memory 26 and the buffers 24. In the present embodiment, there are n-bits for each of the m-subsets; that is, one bit for each of the n words in an n-word burst. Specifically, if there are n-words per burst, and there are m-bits per word then there are n-bits gper burst of order B1, n-bits per burst of order B2, . . . , and n-bits per burst of order Bm. All n-bits of a prescribed order can be simultaneously provided to the memory 26 on the n lines connected to a buffer assigned to store the bits of that order. For example, all n of the B1 bits are provided on the n lines connected to buffer 24-1. This means that the m buffers can transfer n words at a time to or from an addressed location of memory. As explained below, all of these transferred words would have originated at or been targeted to the same external device.

Each port 20 transfers data in a prescribed format between the interconnect matrix 22 and external circuitry (not shown). In this document, a "port burst" shall mean a data burst transferred through a single port in either direction to or from the external circuitry. In a present embodiment as shown in FIG. 5, m-bit data words may be presented by a port to the interconnect matrix 22 for transfer to the buffers 24. Conversely, m-bit data words may be presented to such a port by the interconnect matrix 22 for transfer to the external circuitry. The data word format involves, for each data words, bits B1 through Bm presented in a prescribed order. The interconnect matrix distributes the bits as described above.

The interconnect matrix circuit 22, for example, can be implemented using a printed circuit board (PCB), wire wrap or soldered wires. In the currently preferred embodiment, the interconnect matrix provides the connections between ports and buffers. As explained below, for example, each B1 in each word transferred through port 20-1 is connected by the matrix 22 to a storage element of buffer 24-1 associated with port 20-1; each B1 in each word transferred through port 20-2 is connected by the matrix 22 to a storage element of buffer 24-1 associated with port 20-2; . . . each B1 in each word transferred through port 20-k is connected by the matrix 22 to a storage element of buffer 24-1 associated with port 20-k.

Figure 6:
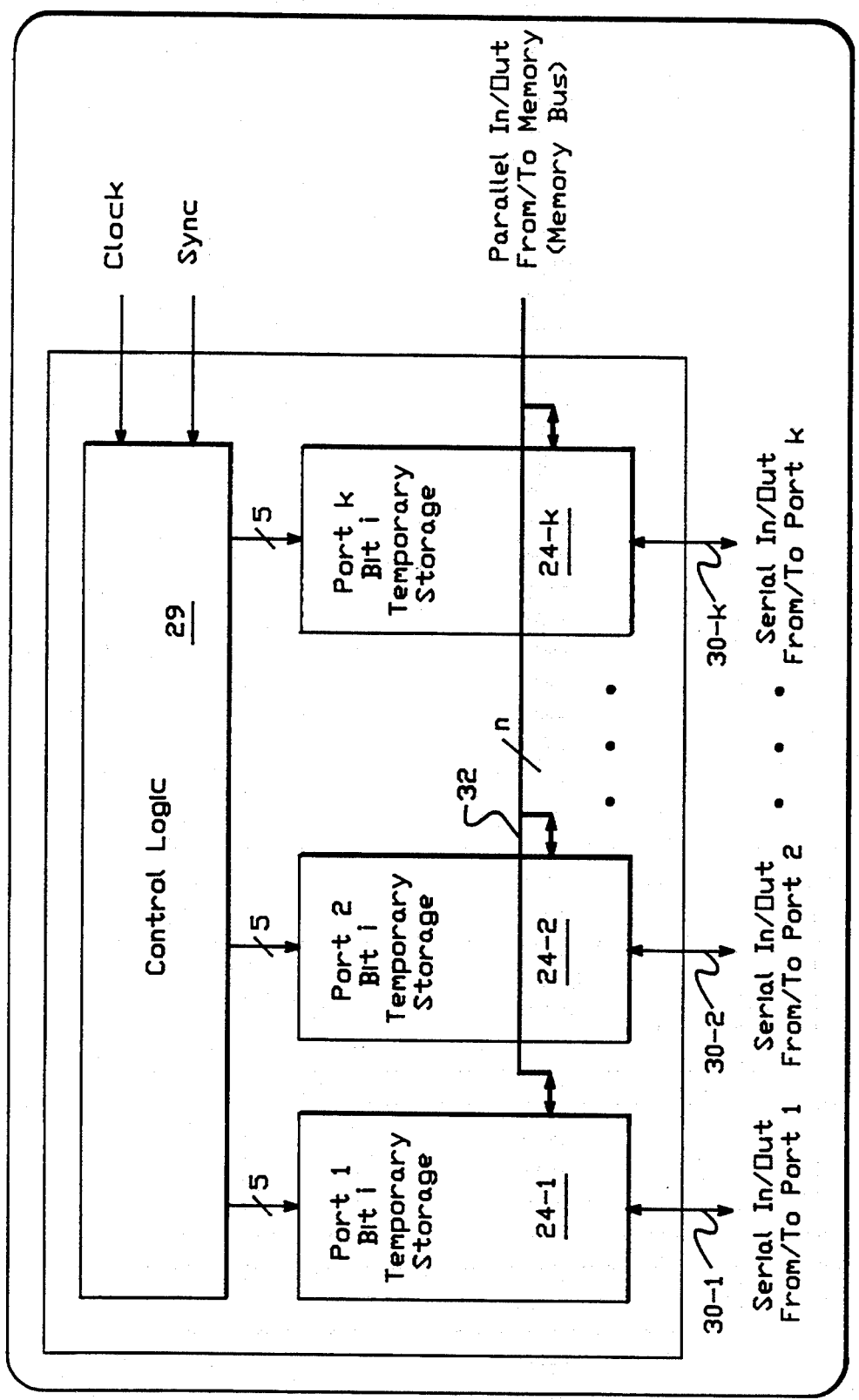
FIG. 6 is a more detailed block diagram of memory access buffers and control logic of the embodiment of FIG. 4.

The memory access buffers can be implemented using either standard or custom logic. The drawings of FIGS. 6-9 illustrate and explain the operation of the memory access buffers 24 and a representative dual register pair 34 of one of the memory access buffers 24. The illustrative block diagram of FIG. 6 shows the memory access buffers 24, control logic 29, serial input/output lines 30 connecting the buffers 24 to an interconnect matrix (not shown) and a n-bit parallel input/output bus 32. The control logic 29 controls serial I/O on lines 30 and parallel I/O on bus 32. The operation of the control logic will be explained with reference to the timing diagram of FIG. 8.

Figure 7:
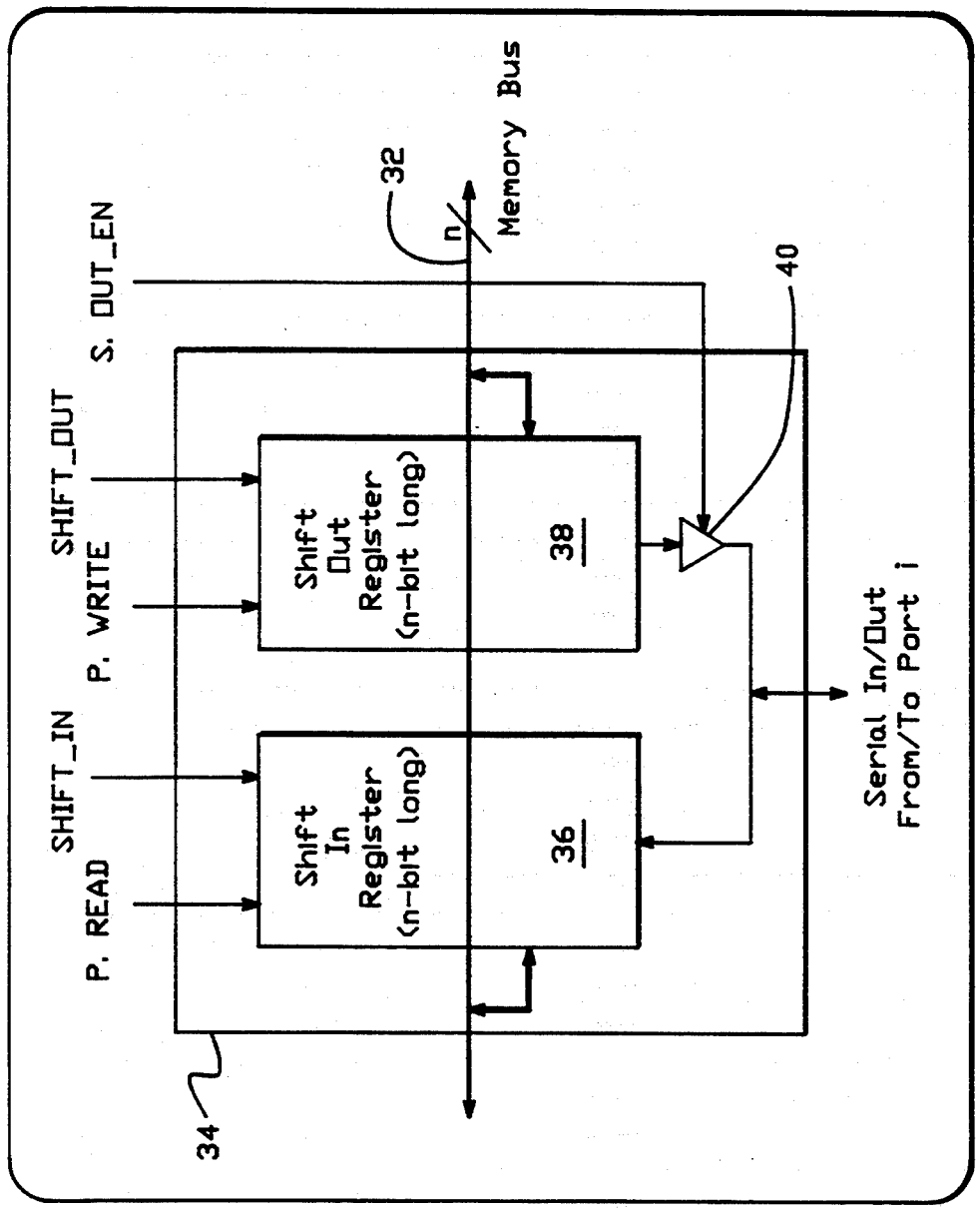
FIG. 7 is a block diagram of a representative dual register pair of the memory access buffers of FIG. 6.

Referring to FIG. 7, there is shown a representative dual n-bit register pair 34. In a present embodiment of the invention, each memory access buffer 24 includes k dual register pairs like the one shown in FIG. 7 for a total of 2k registers per buffer 24. Each register pair in each buffer is associated with one of the ports. Each register pair is dedicated to storing all bits in a prescribed location (order) in every data word transferred to or from the port associated with that register pair. That is, each respective dual register pair of a respective buffer stores and transfers all of the same order bits from each data word transferred through a respective port.

For example, referring to FIG. 5, in buffer 24-1, dual register pair $R_{i1}$ receives and stores the first (in order) bit B1 of each data word transferred through port $P_i$ (not shown). In buffer 24-2, dual register pair $R_{i2}$ receives and stores the second (in order) bit B2 of each word transferred through port $P_i$. In buffer 24-m, dual register pair $R_{im}$ receives and stores the $m_{th}$ (in order) bit Bm of each word transferred through port $P_i$. Thus, for example, all B1s transferred through port $P_i$ represent a subset of the data transferred through that port. Similarly, all B2s represent another subset as do all $B_m$s, for example.

Referring to FIG. 7, there are shown details of a shift-in/shift-out register pair of a representative one of the memory access buffers dual register pair 34 includes a shift-in register 36 and a shift-out register 38. The shift-in register 36 first stores and then asserts in parallel n bits of data onto the memory bus 32 to be written into the shared memory 26. The shift-out register reads in parallel and stores n bits of data from the memory bus 32 which have been read "out" of the shared memory 26.

The data stored in the shift-in register 36 is serially shifted from the interconnect matrix 22 into the shift-in register 36; and from there, it is asserted in parallel onto the bus 32 to be written into the memory 26 as described above. Conversely, the data stored in the shift-out register 38 is read in parallel from the bus 32 into the shift-out register after it has been read from the memory 26; and from there, it is serially shifted from the shift-out register to the interconnect matrix 22. Output enable buffer 40 controls the serial transfer of data from the shift-out register 38 to the interconnect matrix 22.

Figure 8:
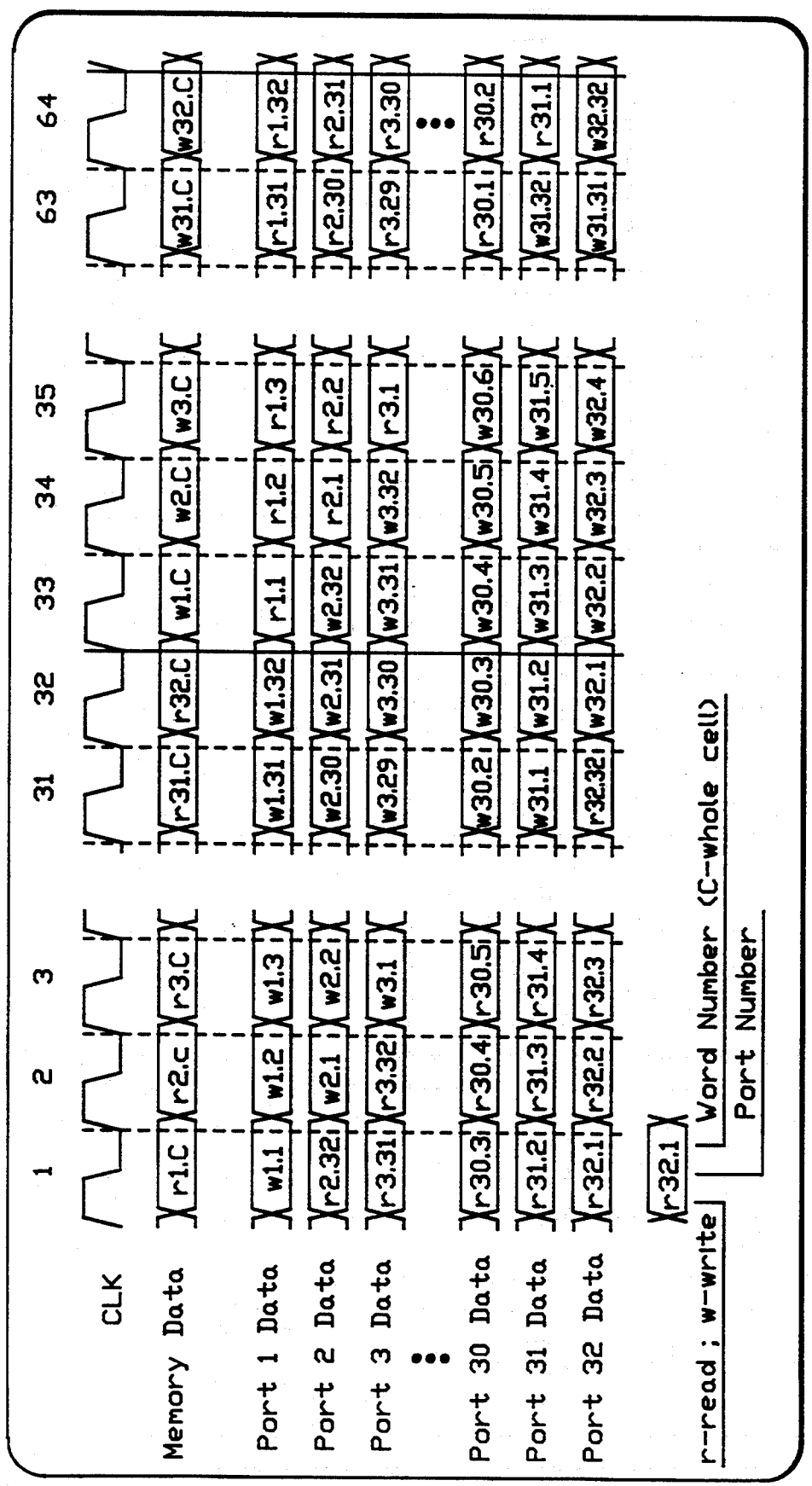
FIG. 8 is a timing diagram which explains the operation of the control logic and memory access buffers of FIG. 6.

Referring to FIG. 8, there is shown a timing diagram for the memory access buffers 24-1 to 24-m of FIGS. 4-6. The timing diagram of FIG. 8 depicts the timing for a thirty-two port system (k=32), with each port having a burst size of thirty-two of words (n=32). Thus, n=k. In a present embodiment, memory access alternates between 32 memory read cycles followed by 32 memory write cycles.

Focusing first on the timing of memory writes, during the Memory Data Write period (clock ticks 33-64), a different thirty-two word burst of data can be written to the common memory 26 for each port 20. Each port has a clock cycle during which data transferred through that port can be written to memory 26. Consecutive ports' data are written on consecutive clock cycles, which are the respective write "time slots" for the respective ports. In order to prepare for the write time slot allocated to it, each port can begin transferring data to the memory access buffers thirty-two clock cycles before its time slot, so that there is sufficient time to transfer all thirty-two words of a burst received by a port to the m buffer registers (each located in a different memory access buffer) assigned to the port before the arrival of the port's time slot. Thus, during the thirty-two clock cycles preceding the "w1.C" on the Memory Data timing line, there are thirty-two serial bit transfers from port 20-1, via the interconnect matrix 22, to the memory access buffer 24-1, depicted as "w1.1", "w1.2" . . . "w1.32" on the port 20-1 Data line. Since each port has a different time slot, the transfers from the ports are appropriately staggered so that each port's burst is ready to transfer to the shared memory just prior to the port's time slot.

More specifically, for example, during each Port 20-1 Data Write Cycle shown in FIG. 8 all of the bits in a first word transferred through Port 20-1 are distributed by the interconnect matrix 22 among the assigned, dual port register pairs of the memory access buffers 24. For example, assuming that there are thirty-two words per burst (n=32) and m bits per word, then during the first Port 20-1 Data Write Cycle, (w1.1) bit 1 (B1) of word 1 (W1) transferred through Port 20-1 is serially written to a prescribed register pair in buffer 24-1; B2 of W1 is serially written to a prescribed register pair in buffer 24-2; B3 of W1 is serially written to a register pair in buffer 24-3; etc. Bm of W1 is serially written to a register pair in buffer 24-m.

Similarly, for example, during the 32nd Port 20-1 Data Write Cycle (w1.32), B1 of W32 transferred through port 20-1 is serially written to the same register pair of buffer 24-1 as was B1 of W1 transferred through port 20-1. Likewise, for example, during the third Port 20-1 Data Write Cycle (w1.3), B6 of W3 transferred through port 20-1 is serially written to the same register pair in memory access buffer 24-6 (not shown) as was B6 of W1 transferred through port 20-1.

Thus, during each of the thirty-two Data Write Cycles for port 20-1 (w1.1 through w1.32), data is serially shifted into designated shift-in registers in the respective memory access buffers 24-1 through 24-m. During Memory Data Cycle w1.C, all of the data that has been serially shifted into the shift-in registers of port 20-1 during the thirty-two prior serial shift-in cycles (w1.1 through w1.32) are asserted in parallel onto the bus 32 so they can be written into the shared memory 26.

Similarly, during the Memory Read period (clock ticks 1-32), thirty-two words of data can be read from the shared memory for each port. For example, during a single one clock memory access cycle at r1.C, thirty-two words can be read from memory 26; these words can be transferred to an external device through port 20-1. Thus, r1.C is the read "time slot" for port 20-1. Likewise, for example, r31.C represents the read time slot for port 20-31.

Specifically, for example, at time slot r1.C a shift-out register in buffer 24-1 receives in parallel all B1s of the thirty-two words read in parallel from the memory 26. Similarly, for example, at time slot r1.C a shift-out register in buffer 24-18 (not shown) receives in parallel all B18s of the thirty-two words read in parallel from the memory 26.

During the thirty-two port 20-1 Data Read Cycles (r1.1 through r1.32) the words read from the memory 26 during Memory Data Read Cycle (r1.C) are serially transferred, via the interconnect matrix 22, to port 20-1. For example, during Data Read Cycle (r1.1), all of the bits for the first word (W1) to be transferred out through port 20-1 are simultaneously serially shifted from m different shift-out registers in m different buffers 24, via the matrix 22, to provide W1 to port 20-1. Likewise, for example, during Data Read Cycle (r1.31), all of the bits for the thirty-first word (W31) to be transferred out through port 20-1 are simultaneously serially shifted from m different shift-out registers in m different buffers 24, via the matrix 22, to provide W31 to port 20-1.

Thus, when data received at a prescribed port is to be written into memory 26, the interconnect matrix distributes the data word bits among multiple buffers so that each buffer only stores a subset of each word to be stored. In the preferred embodiment each buffer stores only bits of a prescribed order. Thus, each buffer need only provide to the bus 32 a subset of all of the data to be simultaneously transferred to memory.

Conversely, when data read from memory is to be output to a prescribed port, the interconnect matrix recombines the bits distributed among multiple buffers so that they are outputted as a series (or burst) of complete words. The entire data to be transferred out through a port is outputted in parallel from the memory and is inputted to the buffers. However, each buffer only receives a subset of that entire data. The interconnect matrix 22 recombines the subsets into a burst of data words.

Thus each of the m respective buffers simultaneously connects one n-bit subset at a time to its parallel bus 32. As illustrated in FIG. 4, there are only m x n connections at any given time between the m buffers and the shared memory 26. Therefore, each buffer requires fewer terminals to interconnect with the shared memory, and there is less capacitive loading due to the fewer connection terminals.

Figure 9:
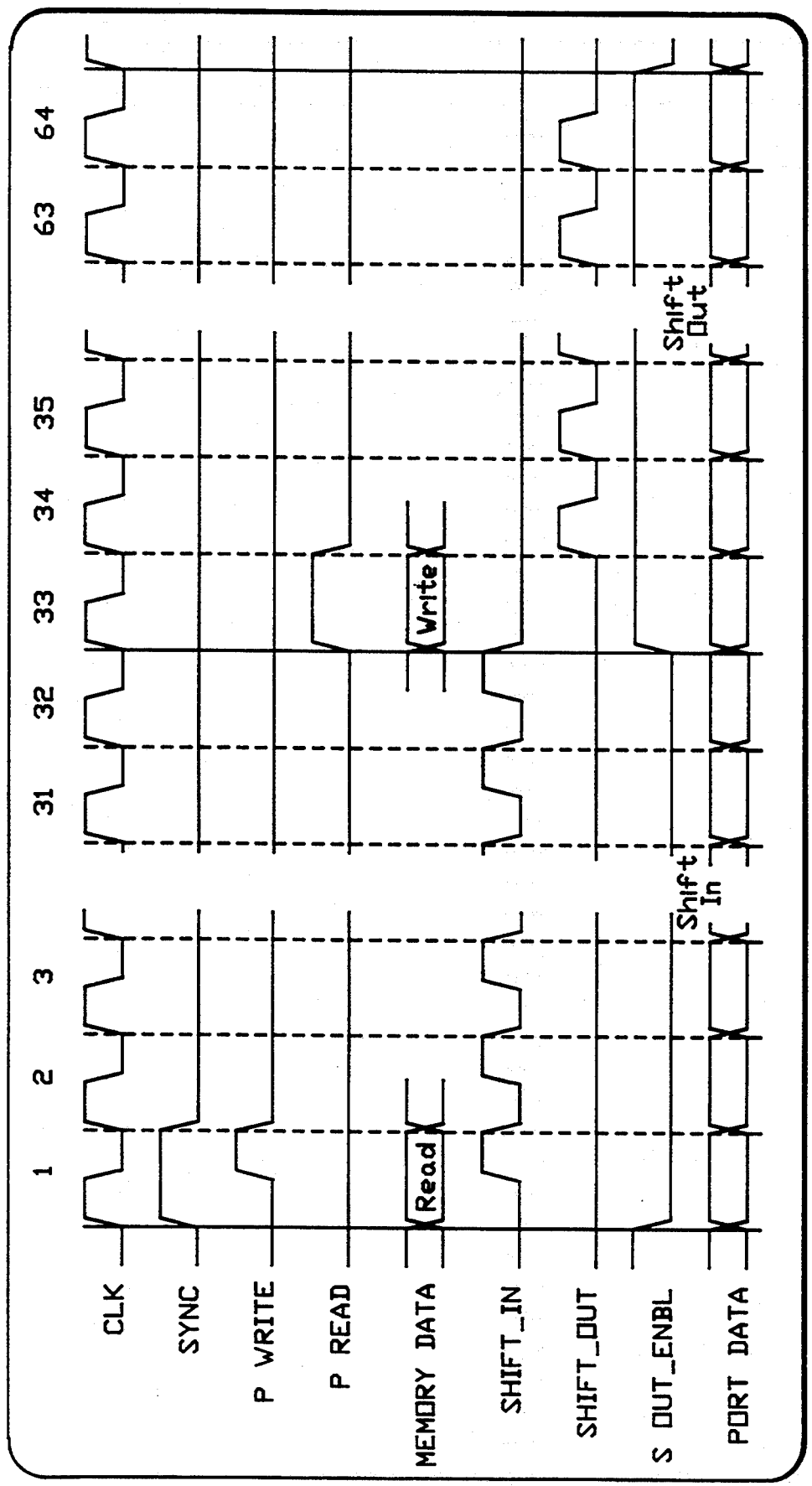
FIG. 9 is a timing diagram which explains the operation of the dual register pairs of FIG. 7.

The illustrative timing diagram of FIG. 9, shows the operation of the dual register pair of FIG. 7. During the P.WRITE pulse, data that has been read from the shared memory 26 during an (rX.c) Memory Data Cycle is written in parallel into the shift-out register 38. During each SHIFT-OUT pulse, a single bit is shifted-out from the shift-out register to the interconnect matrix 22 for transfer to a respective port. For example, for buffer 24-1, each SHIFT-OUT pulse corresponds to an r1.X pulse in FIG. 8. During each SHIFT-IN pulse, a single bit of data is shifted in to the shift-in register. For example, for buffer 24-1, each SHIFT-IN pulse corresponds to an w1.X pulse in FIG. 8. During the P.READ pulse, all of the data that has been shifted in to the shift-in register can be read in parallel to be written to the shared memory 26 during a w1.C cycle.

In the present embodiment, the shared memory 26 can be a standard random access memory (RAM) configuration with a memory width of (n x m). Thus, the memory is able to transfer (n x m) bits of data to or from the memory access buffers 24 simultaneously, and is able to store all (n x m) bits in a single addressed location of memory, as depicted in FIG. 5. In the present embodiment, rather than store each word from a port as contiguous bits, the words are "interleaved", so that all the first order=order bits (B1s) are stored contiguously, followed by all of order bits (B2s), and so forth. In this configuration, all of the bits representing the n words from or to a specific port 20 can be readily stored as a line of the shared memory 26.

In the present embodiment, time slots are pre-assigned. However, time slots could be arbitrated based on priorities. Moreover, since in the current embodiment each of the k ports 20 requires a single clock cycle time slot to communicate with the shared memory 26, and each port requires n clock cycles prior to that time slot to transfer an entire n-word data burst to or from the memory access buffers 24, it is efficient to set the number of words per burst (n) equal to the number of ports (k), thereby providing a smooth, cyclical process for transferring data without bottlenecks or idle times. The relationship between the number of ports and words per burst can change, however, without departing from the invention.

Figure 10:
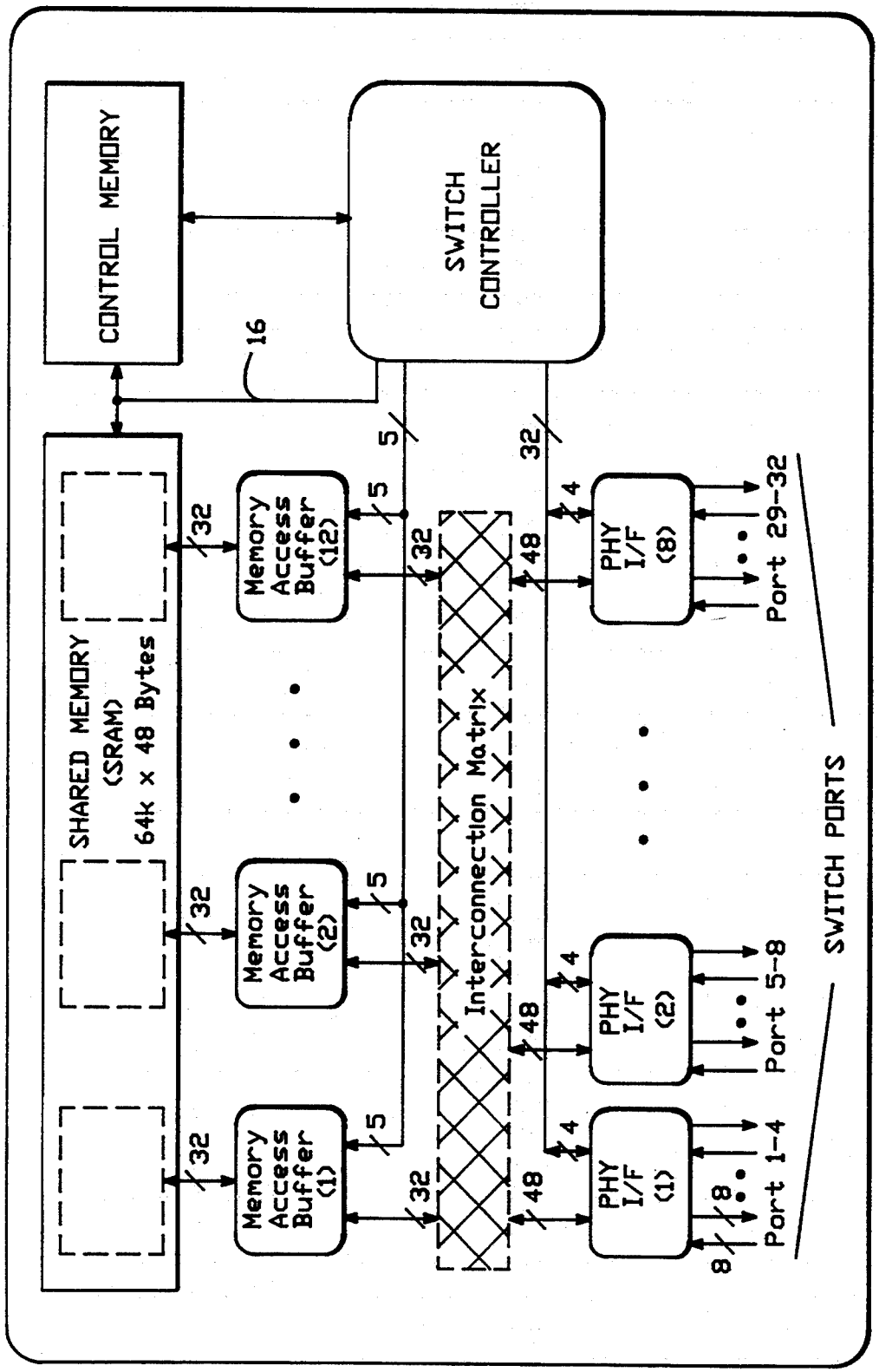
FIG. 10 is a block diagram of an Asynchronous Transfer Mode switch in accordance with the present invention.

FIG. 10 is a block diagram of 32-port Asynchronous Transfer Mode (ATM) switch in accordance with the present invention. ATM is a payload multiplexing technique for information transfer using fixed-size packets, called cells. In a current implementation, an ATM cell is 53-bytes long and consists of a 5-byte header which carries the routing information, followed by a 48-byte information field (payload). The payload of each ATM cell entering the switch is placed in a specific location in the shared memory. As the ATM cell payload is 48-bytes wide (8 bits per byte), shared memory is made 384-bits wide (48×8=384). This implementation was selected to have a 32-bit bus from the memory access buffers to the memory with each port word 12-bits wide, and with port bursts of thirty-two words. Note that 384 is also equal to (12×32); that is, a cell is transferred in a 32-word burst of 12-bit words.

The ATM switch routes each received cell on a port to a destination port according to routing information that is included in each such cell. More particularly, a cell is transferred from a port and stored in shared memory. Then it is retrieved from the shared memory and is transferred to a destination port indicated in the cell. In this manner, data can be switched between ports. The operation of the control memory and the switch controller will be understood by those skilled in the art, form no part of the invention and need not be described herein.

While particular embodiments of the invention have been described in detail herein, it will be appreciated that various modifications can be made to the preferred embodiment without departing from the scope of the invention. Thus, the foregoing description is not intended to limit the invention which is defined in the appended claims.

What is claimed is:

1. For use in a multi-port memory system which includes random access memory (RAM) and multiple data ports, a memory interface comprising:
   multiple buffers, each including multiple storage elements for simultaneous storage of multiple respective data burst subsets transmitted between different respective data ports and said RAM, and further including parallel data path circuitry connectable between individual storage elements and said RAM; and
   an interconnect circuit which includes a multiplicity of data lines which interconnect each respective data port with multiple respective buffers such that different respective subsets of any given data burst transmitted between a respective data port and said RAM are conducted to or from different respective buffers via different respective data lines.

2. The system of claim 1 wherein respective storage elements include serial transfer circuitry which serially transfers data burst subsets to and from said interconnect circuit.

3. The system of claim 1 wherein respective storage elements include respective shift-in register circuitry for serially shifting in respective data burst subsets from said interconnect circuit and include respective shift-out register circuitry for serially shifting out respective data burst subsets to said interconnect circuit.

4. The system of claim 1 wherein respective storage elements include respective serial shift-in/parallel shift-out register circuitry for serially shifting in respective data burst subsets from said interconnect circuit and for parallel shift out of such data burst subsets to said RAM; and
   wherein respective storage elements further include respective parallel shift-in/serial shift-out register circuitry for parallel shift in of respective data burst subsets from said RAM and for serially shifting out such data burst subsets to said interconnect circuit.

5. The system of claim 1,
   wherein respective storage elements include respective serial shift-in/parallel shift-out register circuitry for serially shifting in respective data burst subsets from said interconnect circuit and for parallel shift out of such data burst subsets to said RAM;
   wherein respective storage elements further include respective parallel shift-in/serial shift-out register circuitry for parallel shift in of respective data burst subsets from said RAM and for serially shifting out such data burst subsets to said interconnect circuit;
   wherein respective parallel data path circuitry intermittently connects respective serial shift-in/parallel shift-out register circuitry with said RAM; and
   wherein respective parallel data path circuitry intermittently connects respective parallel shift-in/serial shift-out register circuitry with said RAM.

6. The system of claim 1 wherein respective storage elements include serial transfer circuitry which serially transfers data burst subsets one bit at a time to and from said interconnect circuit.

7. The system of claim 1 wherein said interconnect circuit includes a printed circuit board.

8. For use in a multi-port memory system which includes random access memory (RAM) and multiple data ports, a memory interface comprising:
   multiple buffers, each including multiple storage elements for simultaneous storage of multiple respective data burst subsets in transit between different respective data ports and said RAM, respective storage elements including respective serial shift-in/parallel shift-out register circuitry for serially shifting in respective data burst subsets from said interconnect circuit and for parallel shift out of such data burst subsets to said RAM, respective storage elements further including respective parallel shift-in/serial shift-out register circuitry for parallel shift in of respective data burst subsets from said RAM and for serially shifting out such data burst subsets to said interconnect circuit, said respective buffers further including respective parallel data path circuitry which intermittently connects respective serial shift-in/parallel shift-out register circuitry with said RAM and which intermittently connects respective parallel shift-in/serial shift-out register circuitry with said RAM; and
   a printed circuit board interconnect circuit which includes a multiplicity of data lines which interconnect each respective data port with multiple respective buffers such that different respective subsets of any given data burst in transit between a respective data port and said RAM are conducted to or from different respective buffers via different respective data lines.

9. A multi-port memory system comprising:
   random access memory (RAM);
   multiple data ports;
   multiple buffers, each including multiple storage elements for simultaneous storage of multiple respective data burst subsets transmitted between different respective different respective data ports and said RAM, and further including parallel data path circuitry connectable between individual storage elements and said RAM; and an interconnect circuit which includes a multiplicity of data lines which interconnect each respective data port with multiple respective buffers such that different respective subsets of any given data burst transmitted between a respective data port and said RAM are conducted to or from different respective buffers via different respective data lines.

10. The system of claim 9, including a single RAM integrated circuit.

11. The system of claim 9 and further including:
control circuitry which provides control signals that control simultaneous parallel transfer of all subsets of any given data burst between said RAM and multiple different buffers storing different subsets of such given data burst.

12. The system of claim 9 wherein respective storage elements include serial transfer circuitry which serially transfers data burst subsets to and from said interconnect circuit.

13. The system of claim 9 wherein said respective storage elements include serial transfer circuitry which serially transfers data burst subsets to and from said interconnect circuit; and further including:
control circuitry which provides control signals that control simultaneous parallel transfer of all subsets of any given data burst between said RAM and multiple different buffers storing different subsets of such given data burst and which provides control signals that control transfer of data burst subsets between said interconnect circuitry and different respective buffers.

14. The system of claim 9 wherein respective storage elements include respective shift-in register circuitry for serially shifting in respective data burst subsets from said interconnect circuit and include respective shift-out register circuitry for serially shifting out respective data burst subsets to said interconnect circuit.

15. The system of claim 9 wherein respective storage elements include respective serial shift-in/parallel shift-out register circuitry for serially shifting in respective data burst subsets from said interconnect circuit and for parallel shift out of such data burst subsets to said RAM; and
wherein respective storage elements further include respective parallel shift-in/serial shift-out register circuitry for parallel shift in of respective data burst subsets from said RAM and for serially shifting out such data burst subsets to said interconnect circuit.

16. The system of claim 9,
wherein respective storage elements include respective serial shift-in/parallel shift-out register circuitry for serially shifting in respective data burst subsets from said interconnect circuitry and for parallel shift out of such data burst subsets to said RAM;
wherein respective storage elements further include respective parallel shift-in/serial shift-out register circuitry for parallel shift in of respective data burst subsets from said RAM and for serially shifting out such data burst subsets to said interconnect circuit;
wherein respective parallel data path circuitry intermittently connects respective serial shift-in/parallel shift-out register circuitry with said RAM; and
wherein respective parallel data path circuitry intermittently connects respective parallel shift-in/serial shift-out register circuitry with said RAM.

17. The system of claim 9 wherein respective storage elements include serial transfer circuitry which serially transfers data burst subsets one bit at a time to and from said interconnect circuit.

18. The system of claim 9, wherein said interconnect circuit includes a printed circuit board.

19. A multi-port memory system comprising:
random access memory (RAM);
multiple data ports;
multiple buffers, each including multiple storage elements for simultaneous storage of multiple respective data burst subsets transmitted between different respective data ports and said RAM, respective storage elements including respective serial shift-in/parallel shift-out register circuitry for serially shifting in respective data burst subsets from said interconnect circuit and for parallel shift out of such data burst subsets to said RAM, respective storage elements further including respective parallel shift-in/serial shift-out register circuitry for parallel shift in of respective data burst subsets from said RAM and for serially shifting out such data burst subsets to said interconnect circuit, each of said buffers further including respective parallel data path circuitry which intermittently connects respective serial shift-in/parallel shift-out register circuitry with said RAM and which intermittently connects respective parallel shift-in/serial shift-out register circuitry with said RAM;
an interconnect circuit which includes a multiplicity of data lines which interconnect each respective data port with multiple respective buffers such that different respective subsets of any given data burst transmitted between a respective data port and said RAM are conducted to or from different respective buffers via different respective data lines; and
control circuitry which provides control signals that control simultaneous parallel transfer of all subsets of any given data burst between said RAM and multiple different buffers storing different subsets of such given data burst and which provides control signals that control transfer of data burst subsets between said interconnect circuitry and different respective buffers.

20. A multi-port memory system comprising:
random access memory (RAM);
k data ports;
m buffers, each including k storage elements for simultaneous storage of multiple respective n-bit subsets of n-word data bursts transmitted between different respective data ports and said RAM, and further including parallel data path circuitry connectable between individual storage elements and said RAM;
wherein each respective n-bit subset consists of all n respective bits that occupy the same respective bit position in different respective data words of a respective n-word data burst; and
an interconnect circuit which includes a multiplicity of data lines which interconnect each respective data port with m different buffers such that the m different respective n-bit subsets of any given m-word data burst transmitted between a respective data port and said RAM are conducted to or from m different respective buffers.

21. The system of claim 20 wherein k=m.

22. A method for transferring n-word data bursts that include m bits per word between k data ports and random access memory (RAM) comprising the steps of:
    partitioning data bursts transferred through respective data ports into respective data burst subsets in which each respective subset includes n respective bits wherein such n respective bits occupy the same respective bit position in different data words of a respective data burst;
    providing m buffers, each including k storage elements;
    temporarily storing different data burst subsets of a respective data burst in transit to or from any respective data port and the RAM in different storage elements within different buffers; and
    transferring all of the different data burst subsets of a respective data burst in transit to or from any respective data port and the RAM in parallel between different storage elements in different buffers and the RAM.

23. The method of claim 20 wherein k=m.

24. The method of claim 20 wherein each data burst subset includes n bits.

25. The method of claim 20 and further including the step of:
    serially transferring respective data burst subsets of a respective data burst transmitted to or from any respective data port and the RAM between such respective data port and different storage elements in different buffers.

26. The method of claim 20 and further including the step of:
    serially transferring, one bit at a time, respective data burst subsets of a respective data burst in transit to or from any respective data port and the RAM between such respective data port and different storage elements in different buffers.

27. A multi-port memory system comprising:
    random access memory (RAM);
    k data ports;
    means for partitioning data bursts transferred through respective data ports into respective n-bit data burst subsets in which each respective subset includes n respective bits wherein such n respective bits occupy the same respective bit position in different data words of a respective data burst;
    m buffers means, each including k storage element mean for temporarily storing different data burst subsets of a respective data burst in transit to or from any respective data port and the RAM in different storage element means within different buffer means; and
    means for transferring all of the different data burst subsets of a respective data burst in transit to or from any respective data port and the RAM in parallel between different storage element means in different buffer means and the RAM.

28. The method of claim 27 wherein k=m.

29. For use in a multi-port memory system which includes random access memory (RAM) and multiple data ports, a memory interface comprising:
    multiple buffers, each including multiple storage elements for simultaneous storage of multiple respective data burst subsets transitted between different respective data ports and said RAM; and
    an interconnect circuit which includes a multiplicity of data lines which interconnect each respective data port with multiple respective buffers such that different respective subsets of any given data burst transitted between a respective data port and said RAM are conducted to or from different respective buffers via different respective data lines.

30. The system of claim 29,
    wherein respective buffers include parallel data path circuitry connectable between individual storage elements and said RAM; and
    wherein respective storage elements include serial transfer circuitry which serially transfers data burst subsets to and from said interconnect circuit.

* * * * *

UNITED STATES PATENT AND TRADEMARK OFFICE
CERTIFICATE OF CORRECTION

PATENT NO. : 5,440,523
DATED : August 8, 1995
INVENTOR(S) : Alexander Joffe

It is certified that error appears in the above-indentified patent and that said Letters Patent is hereby corrected as shown below:

Col. 5, line 3
    Delete "gper" and insert --per--.

Col. 6, line 35
    Delete "of" second occurrence.

Col. 7, line 63
    Delete "multiple" and after "buffers" insert --24-1 to 24-m--.

Col. 10, line 57 (Claim 8)
    Delete "in transit" and insert --transmitted--.

Col. 13, line 38 (Claim 26)
    Delete "in transit" and insert --transmitted--.

Col. 13, line 39 (Claim 26)
    Delete "any" and insert --a--.

UNITED STATES PATENT AND TRADEMARK OFFICE
CERTIFICATE OF CORRECTION

PATENT NO. : 5,440,523
DATED : August 8, 1995
INVENTOR(S) : Alexander Joffe

It is certified that error appears in the above-indentified patent and that said Letters Patent is hereby corrected as shown below:

Col. 14, line 20 (Claim 28)
    Delete "method" and insert --system--.

Col. 14, lines 26 and 32 (Claim 29)
    Delete "transitted" and insert --transmitted--.

Signed and Sealed this

Ninth Day of September, 1997

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,440,523
DATED : August 8, 1995
INVENTOR(S) : Alexander Joffe

It is certified that error appears in the above-identified patent and that said Letters Patent is hereby corrected as shown below:

Column 10, line 67 (Claim 9)
    Before "data ports" delete "different respective"

Column 12, lines 67-68 (Claim 20)
    Delete "m-word" and insert --n-word--

Column 13, line 24 (Claim 23)
    Delete "20" and insert --22--

Column 13, line 25 (Claim 24)
    Delete "20" and insert --22--

Column 13, line 27 (Claim 25)
    Delete "20" and insert --22--

UNITED STATES PATENT AND TRADEMARK OFFICE
CERTIFICATE OF CORRECTION

PATENT NO. : 5,440,523
DATED : August 8, 1995
INVENTOR(S) : Alexander Joffe

It is certified that error appears in the above-identified patent and that said Letters Patent is hereby corrected as shown below:

Column 13, line 34 (Claim 26)
    Delete "20" and insert --22--

Signed and Sealed this

Tenth Day of March, 1998

*Attest:*

BRUCE LEHMAN

*Attesting Officer*     *Commissioner of Patents and Trademarks*